Figures 1, 2, 3:
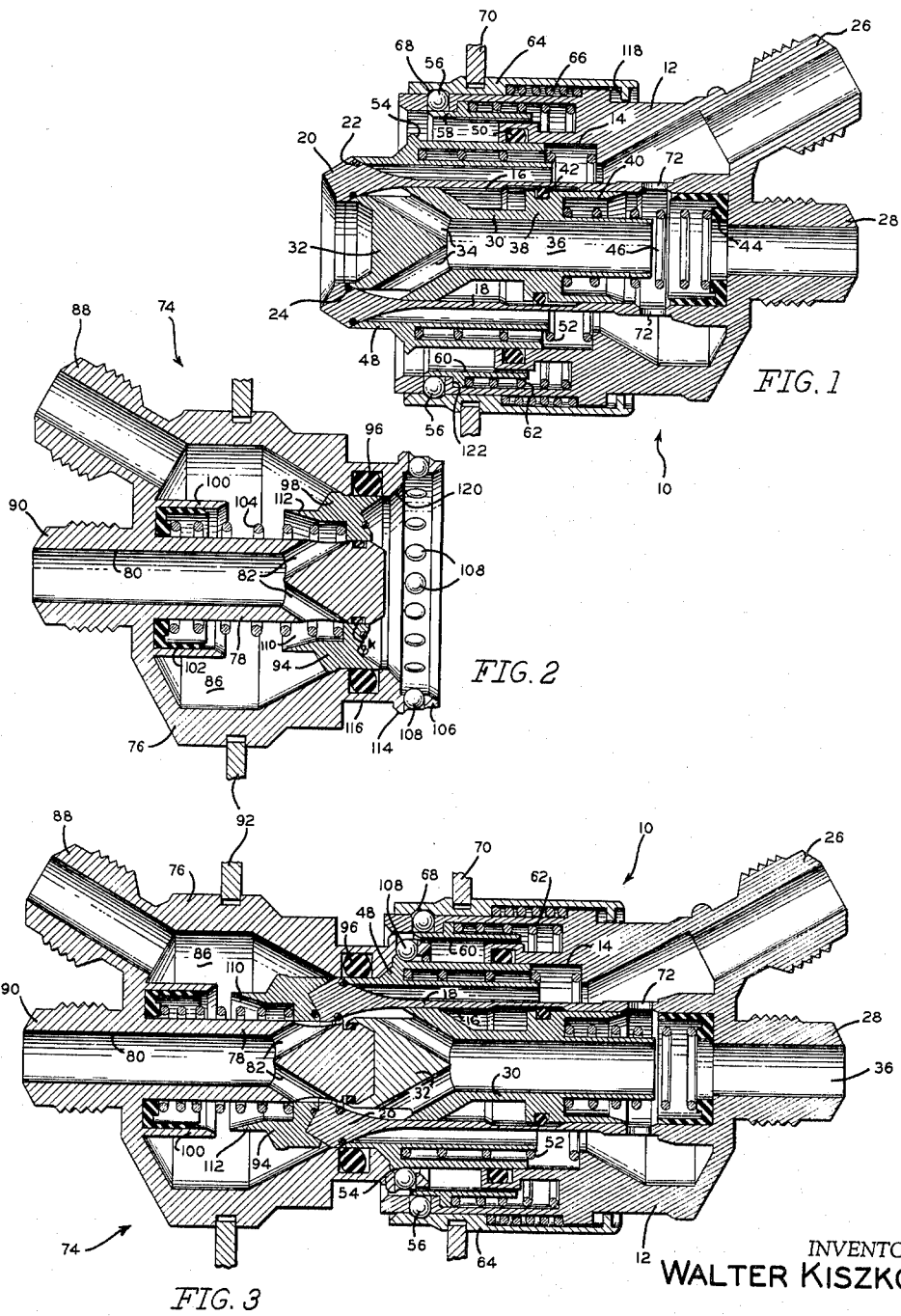

Oct. 12, 1965 W. KISZKO 3,211,178
CONCENTRIC COUPLING
Filed July 24, 1961 2 Sheets-Sheet 1

INVENTOR
WALTER KISZKO
BY
ATTORNEY

Oct. 12, 1965  W. KISZKO  3,211,178
CONCENTRIC COUPLING
Filed July 24, 1961  2 Sheets-Sheet 2

INVENTOR
WALTER KISZKO
BY Jerry K Harness
ATTORNEY

United States Patent Office 3,211,178
Patented Oct. 12, 1965

3,211,178
CONCENTRIC COUPLING
Walter Kiszko, Van Nuys, Calif., assignor to Aeroquip Corporation, a corporation of Michigan
Filed July 24, 1961, Ser. No. 126,049
1 Claim. (Cl. 137—614.04)

The invention pertains to a fitting for conduit systems and particularly relates to a quick-disconnect coupling defining a plurality of flow paths.

In the design of conduit systems it is not uncommon to employ a plurality of couplings to interconnect various components in the system, for instance, a pair of conduits, usually steam and air lines, interconnect adjacent railway cars. In the aircraft and missile fields it is often necessary to transmit a plurality of liquids or gases to the various stages or components of the aircraft. When it is desired to employ more than one conduit between components of a system usually a separate conduit, with separate couplings, is employed for each flow path. Such an arrangement necessitates a plurality of separate and distinct connecting and disconnecting operations in that each coupling requires individual attention and operation.

Couplings are known wherein a plurality of conduits may be connected or disconnected by a single coupling operation. Such couplings often employ manifold structure wherein the conduits transmit like mediums and intermingling of the medium is not a problem. Known couplings which maintain a plurality of distinct flow paths therethrough are of such bulky and heavy design as to make the handling thereof difficult and the functioning of the components of the coupling is often undependable.

It is an object of the invention to provide a concise coupling forming at least two separate flow paths therethrough wherein, if desired, separate fluids may be transmitted therethrough without intermingling, and such flow paths may be established by a single easily achieved coupling action. Furthermore, it is intended that the coupling be self-closing upon disconnection of the coupling halves.

Another object of the invention is to provide a multi-flow path, quick-disconnect coupling wherein the flow paths are concentric and relative unrestricted and capable of high flow rates.

Another object of the invention is to provide a coupling having at least two concentric flow paths therethrough and each coupling half is associated with a pair of conduits. In one embodiment of the invention the coupling half permits flow from one conduit to the other affixed to a common half during disconnection of the coupling halves. This same embodiment seals the conduits connected to a common half relative to each other upon interconnection of the coupling halves wherein two separate flow paths through the coupling are produced. This embodiment, employing bypass ports between coupling passages, can be employed to relieve a pump in a hydraulic pressure system and eliminate the need for a relief valve. Also, it permits uninterrupted circulation in series circuits wherein disconnection of one component would disrupt circulation to the others. This embodiment may also be used to provide uninterrupted cooling to the coupling and related components subjected to high temperatures, and it also permits purging of the conduit lines after the coupling has disconnected.

Another object of the invention is to provide a coupling permitting interconnection of a plurality of conduits wherein the possibility of improperly connecting the lines or cross-connecting is eliminated.

Another object of the invention is to provide a multi-passage coupling wherein the passages of the coupling are automatically closed upon disconnection of the coupling halves, and each of the passages will be simultaneously closed. It is also a purpose of the invention to provide a coupling having negligible air inclusion during connection and negligible fluid loss during disconnection.

Yet another object of the invention is to provide a coupling having a plurality of concentric flow passages wherein positive acting and readily operable latching means between the couplings are employed and wherein means are employed for insuring the operation of valve closing structure during disconnection.

Figure 4:
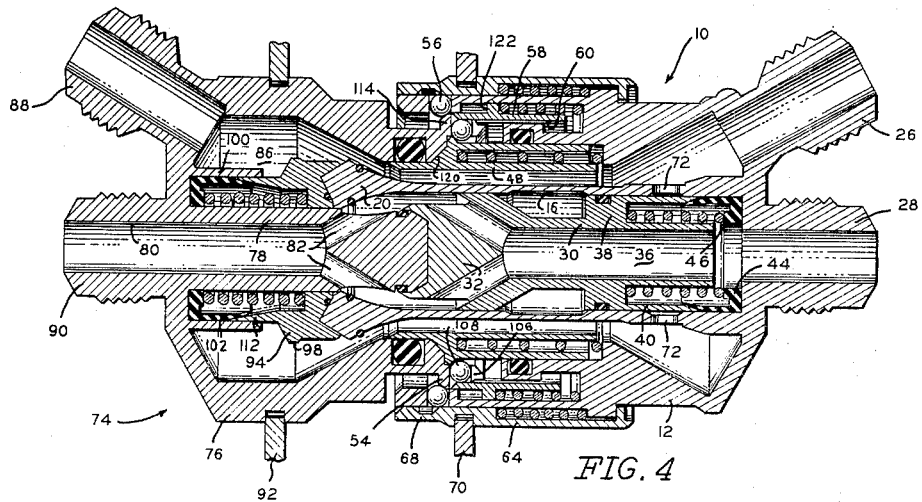
Figure 5:
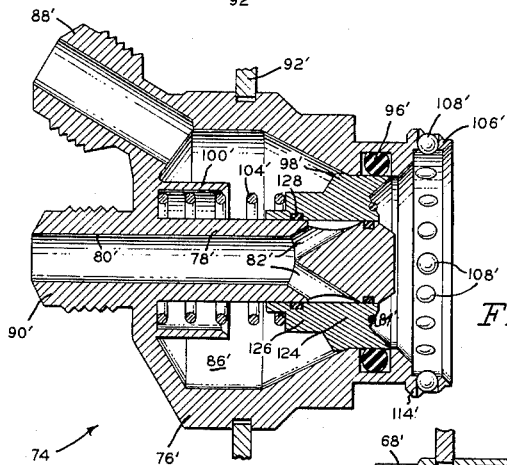
Figure 6:
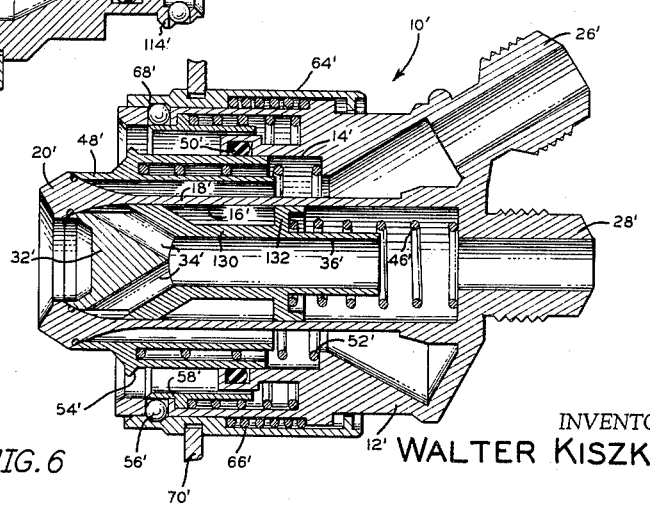

These and other objects of the invention arising from the structural relationships and details of embodiments thereof will be apparent from the following description and accompanying drawings wherein:

FIG. 1 is an elevational sectional view of one coupling half embodiment in accord with the invention, FIG. 2 is a sectional elevational view of the other coupling half of the embodiment employed with the half of FIG. 1, FIG. 3 is an elevational sectional view showing the coupling halves of FIGS. 1 and 2 during partial connection of the valves, FIG. 4 is an elevational sectional view of the coupling halves of FIGS. 1 and 2 shown in the fully connected relation, FIG. 5 is an elevational sectional view of another embodiment of a coupling half in accord with the invention, and FIG. 6 is an elevational sectional view of the embodiment of the coupling half employed with that of FIG. 5.

Referring to FIGS. 1 through 4, the embodiment of the invention will be described employing bypass ports wherein separate flow paths during coupling connection are provided and intercommunication of conduits affixed to a common coupling half during disconnection is produced.

Referring to FIG. 1 the coupling half 10 includes a body portion 12 of substantially cylindrical exterior configuration and having an open end as viewed from the left. Body portion 12 includes an outer bore 14 concentrically related to the longitudinal axis of the body and an axial inner bore 16 extending through the body. The bores 14 and 16 are separated by an annular tubular member 18 which is integral with the body, and which extends to the left beyond the body open end substantially beyond the portions of the body 12. The outer end of member 18 is provided with an enlarged head 20 having an exterior annular sealing ring 22 received in a groove therein and an inner sealing ring 24. A bored threaded conduit connection 26 is formed upon body 12 in communication with the bore 14 and the bored threaded conduit connection 28 formed on the body member is in communication with the central bore 16.

A tubular valve element 30 is slidingly mounted within the central bore 16 and is provided with a head 32 having ports or passages 34 communicating with the central passage 36 of the valve. In the closed position as shown in FIG. 1, the head 32 will sealingly engage with the ring 24 to prevent flow through the passage 36. An enlarged portion 38 is defined upon the valve 30 having a cylindrical skirt portion 40 thereon extending toward connection 28 and an annular groove mounts a sealing ring 42 to seal portion 38 with respect to bore 16. The right end of bore 16 receives an annular seal member 44 and a tension spring 46 is interposed between the seal 44 and the valve portion 38 biasing the valve 30 to the closed position. The spring also maintains the seal 44 in the bore 16.

The outer cylindrical flow path valve includes a tubular sleeve element 48 slidably received within the bore 14, and sealingly engageable with sealing rings 22 and 50, FIG. 1. A tension spring 52 interposed between the body member 12 and valve sleeve 48 maintains the valve sleeve in the closed position. An annular shoulder 54 is defined on the sleeve 48 for reasons which will be later described.

The latching of the coupling is achieved by a plurality of radially movable balls 56 mounted in the body member 12. The balls 56 are mounted within a plurality of radial holes evenly spaced about the circumference of the body member and an inwardly disposed annular retainer 58 maintains the balls from an excessive inward movement during disconnection. The edge of the ball receiving holes may also be deformed inwardly to maintain the balls therein. The retainer member 58 is provided with an internal cylindrical surface 60 and is spring biased to the left by the tension spring 62.

The latching actuation member consists of a tubular element 64 slidably mounted upon the exterior surface of a body member 12. A spring 66 biases the element 64 to the left such that an innerly disposed annular groove 68 may align with the balls 56 as shown in FIG. 1. The groove 68 is provided with beveled side surfaces which tend to cam the balls inwardly upon removal of the retainer 58 due to the influence of the spring 66. A groove may be defined in the latch element 64 to receive an actuating member 70 for shifting the latch element which may be either associated with mechanical means for coupling or discoupling or may permit manual actuation of the latching.

In the embodiment of FIG. 1 a plurality of ports 72 extend through the member 18 to establish communication between the bore 14 and bore 16. As will be seen in FIG. 1, when the valve 30 is biased to its extreme left position the skirt 40 will not cover the ports 72 and fluid may freely flow therethrough. Thus, in the disconnected relation the mediums transmitted by the conduits connected to the connections 26 and 28 are in communication.

The other half 74 of the coupling shown in FIGS. 1 through 4 will be described in conjunction with FIG. 2. This coupling half includes a body member 76 having an axial extending projection 78 provided with a bore 80 therein and a plurality of radially extending passages 82 communicate with the bore 80 and intersect the outer surfaces of the projection inwardly of an annular seal 84 mounted thereon. The body member 76 is also provided with an annular chamber or bore 86 which is in communication with a threaded conduit connection 88 formed integral with the body and the conduit connection 90 is in direct communication with the bore 80. An annular groove on the body member permits the attachment of the body to a support member 92, if desired.

The sliding valve member 94 is supported on projection 78 and is of an annular form having an internal cylindrical surface which sealingly engages the sealing ring 84 and an outer cylindrical surface thereof engages the body mounted annular sealing ring 96. A shoulder 98 is defined upon the valve member 94 for engagement with the body member to limit movement of the valve to the right, as shown in FIG. 2.

An annular sleeve portion 100 is defined with the body member 76 concentric with the axis thereof and serves to support a resilient seal 102. The tension spring 104 interposed between the seal 102 and valve 94 tends to maintain the valve in the closed position, and the seal 102 within the sleeve 100. An annular extension 106 is defined upon the body member 76 having a plurality of holes therein receiving radially movable balls 108. The ball receiving holes are provided with tapers or deflected projections adjacent the ends thereof wherein the balls 108 will be retained within the holes.

It will be noted that the valve member 94 is recessed as at 110 forming a skirt 112, wherein fluid flowing through the passages 82, with the valve in the closed position, may flow into the chamber 86 thereby establishing communication between the conduits affixed to connections 88 and 90.

The operation and interrelationships between the coupling halves during connection may be best appreciated from FIGS. 3 and 4. To connect the coupling halves the longitudinal axes are aligned and the coupling halves brought into engagement. To minimize the inclusion of air into the conduit system served by the coupling, the end of projection 78 is received within a complementary shaped recess within valve 30 and the head of member 18 is shaped to be complementarily received within an annular recess within valve 94. As the coupling halves continue to be moved toward each other the balls 108 will ride over the valve shoulder 54 and assume the position shown in FIG. 3. Continued axial movement of the halves 10 and 74 toward each other will abut the shoulder 114 of extension 106 with the ball retainer 58 to move the retainer to the right and permit the balls 56 to move inwardly over the shoulder 114 toward the groove 116 defined on body member 76. Upon removal of the retainer 58 from engagement with balls 56 the spring 66 will urge latch element 64 to the left and cam the balls inwardly and thus, maintain them within the groove 116 to insure a positive connection between the coupling halves. Movement of the element 64 to the left is limited by the abutment of shoulder 118 with body member 12.

Due to the relative engagement of the projection 78 with the valve 30, the valve sleeve 48 with the shoulder 120 on body 76 and the valve 94 with the member 18, the valve elements are being displaced to open positions during the connection of the coupling halves and upon the couplings being fully connected, as shown in FIG. 4, the valves will be in their fully open position. It will be noted that the sealing ring 96 cooperates with the valve sleeve 48 to prevent the escape of fluid during both partial and complete connection of the coupling halves.

In that the valve 30 is biased to the right relative to the ports 72, the skirt 40 will cover the ports 72 and sealingly associate itself with the resilient seal 44, thus, sealing bore 14 with respect to bore 16. As the valve member 94 is being biased to the left, relative to projection 78, the valve skirt 112 will engage the resilient seal 102, FIG. 4, and passages 82 will no longer be in communication with chamber 86. This sealing configuration, wherein the annular valve skirts slide under the annular lips of the resilient seals is considered to be a novel inventive concept. As will be appreciated from FIG. 4, the complete connection of the coupling halves will establish communication between passages 34 and 82, and bores 16 and 80 to provide a relatively unrestricted central flow path through the coupling. Likewise, the annular bore 14 and chamber 86 will now be in communication and an annular flow path is produced to establish communication between connections 26 and 88. Thus, two concentric and separate flow paths through the coupling are produced. It will be noted that resilient sealing rings are located as to prevent intermingling between the concentric flow passages.

To disconnect the coupling halves the latching element 64 is pulled to the right to align grooves 68 with the balls 56. This action, along with the maintenance of opposed axial forces tending to separate the couplings due to the compression of the various tension springs, permits the balls 56 to radially move outwardly and ride over the shoulder 114. The coupling halves will then quickly and easily move apart and the valve elements 30, 48 and 94 will return to their closed positions under the influence of the springs. During the disconnection of the coupling halves the retainer surface 60 will retain the balls 108 in engagement with the valve shoulder 54 until complete disconnection is substantially achieved. This relation between balls 56 and shoulder 54 positively insures the return of the valve sleeve 48 to the closed position, regardless of the biasing force of spring 52. Upon the disconnection being substantially fully completed, movement of the retainer 58 to the left will be restrained by the abutment of a shoulder on body 12 with a shoulder 122 defined upon valve 48 and thereupon the balls 108 may ride over the shoulder 114.

The coupling half embodiments shown in FIGS. 5 and 6 employ many components identical to those previously described and identical components are indicated by primed reference numerals. The embodiment of FIGS. 5 and 6 is similar in all respects to the above described embodiment except that modifications are made to the valve elements wherein the medium within the conduits affixed to a common coupling half are not in communication during disconnection of the coupling halves. Thus, the embodiments shown in FIGS. 5 and 6 would be employed in those instances wherein dissimilar fluids which are not to be intermixed flow through the bores of the housing halves.

Referring to FIG. 5, the structural distinctions over the embodiment of FIG. 2 primarily consist in the configuration of the valve element 124. The valve element 124 is provided with cylindrical surfaces which sealingly coact with the sealing rings 84' and 96' in the closed position and the valve element includes an axially extending portion 126 which completely seals the passages 82'. Sealing ring member 128 prevents leakage from the passages 82' into the chamber 86'. In the embodiment of FIG. 5, the sealing member 102 may be eliminated from the sleeve 100'.

The coupling half of FIG. 6 distinguishes over that shown in FIG. 1 in that the valve member 130 is not provided with a skirt and no ports are provided in the member. Valve 130 is provided with an annular projection 132 which guides the axial sliding movement of valve 132 within bore 16' and spring 46' biases the valve member to the left to insure self-closing of this valve during disconnection. In the embodiment in FIG. 6 the sealing member 44 may be eliminated.

Other than those changes mentioned above the cooperation and assembly of the coupling halves of FIGS. 5 and 6 will be the same as those described with reference to FIGS. 3 and 4, and upon connection of the halves of FIGS. 5 and 6 concentric flow passages will be defined through the coupling.

It will be appreciated that the above described structure accomplishes the objects of the invention, and while the structure is shown as being employed with couplings having two concentric flow paths, the concept of the invention may be extended to couplings employing three or more concentric flow paths. In actual practice, manufacture and assembly of the body members require the body members be formed in several assemblable pieces. However, for purposes of illustration the body members are shown as unitary structures.

It is appreciated that various embodiments of the invention may be apparent to those skilled in the art without departing from the spirit and scope thereof, and it is intended that the invention be defined only by the scope of the following claim:

I claim:

In a fluid coupling comprising first and second interconnectable body members, a first passage defined within said first body member extending therethrough, a second passage defined within said first body member concentric to said first passage, conduit attaching means formed at one end of said passages, first valve means within said first body member operatively associated with said passages controlling fluid flow therethrough, spring means biasing said valve means closed, a first cylindrical passage within said second body member extending therethrough, a second cylindrical passage defined within said second body member concentric to said first cylindrical passage, a cylindrical wall separating said first and second cylindrical passages, conduit attaching means formed at one end of said first and second cylindrical passages, second valve means within said first cylindrical passage and third valve means within said second cylindrical passage controlling the flow of fluid therethrough, said second valve means having a cylindrical sleeve engaging the interior surface of said wall, spring means biasing said second and third valve means closed, interconnectable connecting means carried by said body members whereby said body members may be coupled together with said first and said first cylindrical, and said second and second cylindrical passages respectively, in alignment and communication, first abutment means defined on said first body member operatively engaging and opening said second and third valve means during interconnection of said body members, second abutment means defined on said second body member operatively engaging and opening said first valve member during interconnection of said body members, and port means defined in said cylindrical wall intermediate said first cylindrical passage conduit attaching means and said second valve means sleeve providing a fluid path between said cylindrical passages, said sleeve on said second valve means being spaced from said port means when said second valve means is closed and being shifted to cover and close said port means when said second valve means is open.

References Cited by the Examiner

UNITED STATES PATENTS

| 2,457,251 | 12/48 | Main | 284—19 |
| 2,553,680 | 5/51 | Scheiwer | 284—19.1 |
| 2,568,516 | 9/51 | Scheiwer | 284—19.1 |
| 2,744,770 | 5/56 | Davidson et al. | 285—316 |
| 2,941,821 | 6/60 | Klee | 284—19 |

FOREIGN PATENTS

| 616,242 | 3/61 | Canada. |
| 829,096 | 2/60 | Great Britain. |

WILLIAM F. O'DEA, *Primary Examiner.*

WALTER A. SCHEEL, *Examiner.*